United States Patent [19]

Williams

[11] 4,215,646
[45] Aug. 5, 1980

[54] LOW PRESSURE DIFFERENTIAL DETECTING WHISTLE

[76] Inventor: Douglas J. Williams, P.O. Box 55083, Valencia, Calif. 91355

[21] Appl. No.: 957,444

[22] Filed: Nov. 3, 1978

[51] Int. Cl.² .......................... B60Q 5/00; G10K 5/00
[52] U.S. Cl. ................................. 116/70; 116/58 R; 116/112; 116/137 R; 116/138; 116/DIG. 19; 116/DIG. 25
[58] Field of Search ........ 116/70, DIG. 19, DIG. 25, 116/137 R, 137 A, 138, 112, 58 R; 46/179; 340/406; 84/335

[56] References Cited

U.S. PATENT DOCUMENTS

| | | | |
|---|---|---|---|
| 1,530,899 | 3/1925 | Limon | 116/137 R |
| 1,540,023 | 6/1925 | Kolliner | 116/137 R |
| 1,863,456 | 6/1932 | Smith | 116/DIG. 25 |

FOREIGN PATENT DOCUMENTS

| | | | |
|---|---|---|---|
| 348883 | 2/1922 | Fed. Rep. of Germany | 116/137 R |
| 894532 | 4/1962 | United Kingdom | 116/137 A |

Primary Examiner—Gerald Goldberg
Assistant Examiner—Denis F. Corr
Attorney, Agent, or Firm—Christie, Parker & Hale

[57] ABSTRACT

A whistle audibly responsive to extremely small pressure differentials is described. The whistle has a cylindrical inlet portion, a cylindrical outlet portion and a cylindrical constriction that form a passageway between said inlet and outlet portions. The whistle produces audible sound having an intensity of about 80 DB in response to a pressure differential, across the inlet and outlet portions, that is in the range of about 0.005 to 0.02 psi.

16 Claims, 4 Drawing Figures

LOW PRESSURE DIFFERENTIAL DETECTING WHISTLE

BACKGROUND OF THE INVENTION

1. Field of the Invention

This application relates to whistles, and in particular, to a whistle that produces audible sounds when a very low pressure differential exists across the whistle.

2. Description of the Prior Art

Various techniques have been used in the detection of low pressure differentials in air flows. Such devices include mechanical transducers having moving parts that respond to and thus indicate the level of the sensed pressured differential. One such type of mechanical pressure measurement is by means of a Bourdon tube. The most simple form of Bourdon tube is a hollow flat double ribbon that is bent into an arc which has a lever mechanism operated pressure indicator that is connected to a closed end of the tube. A pressure change at an inlet or open end of the tube causes the tube to straighten and thus, through the action of the lever mechanism causes the pressure indicator to move. A characteristic, however, of such devices is that they are subject to malfunction due to friction between the moving parts and deterioration because of age.

A second type of pressure indicator is a diaphragm or bellows gauge. The pressure is sensed by the responsive movement thereto of flexible metallic diaphragms, that are usually formed into flat, disk-like capsules and often having several such capsules stacked together.

As in the case of the Bourdon gauge, the pressure indicator actuating force that is due to the pressure in the gauge, is usually balanced by the elasticity of the diaphragm and also by the pressure existing at the exterior surface of the pressure sensing element.

The described devices, although capable of pressure measurement, however, suffer from the inability to detect pressure differentials in air flows, because the devices are sealed and thus do not permit air to flow therethrough. For the purposes of this application, air flows are intended to be synonymous with and include any gaseous flow.

Pressure differentials in air flows arise typically across filters as would be found in furnaces, air conditioning systems and automobile carburetors. When the particulate matter trapped in such filters restricts the air flow, a pressure differential across the filter results. Increasing particulate concentrations within the filter eventually prevent proper air flow through the filter giving rise to increased pressure differentials and degraded filter performance.

Additionally, the devices in the prior art suffer from an inability to detect small pressure differentials especially in the range of 0.005 to 0.02 psi. Generally, such devices respond to pressures greater than 0.5 psi.

Further, the devices described require either visual observance of the pressure indicators or require complex mechanical or electrical techniques for pressure indication.

SUMMARY OF THE INVENTION

The present invention contemplates a low pressure differential detecting whistle formed from a conduit having an inlet portion of a first diameter located at one end, an outlet portion of a second diameter less than the first diameter located at the other end, the outlet portion extending within the conduit for a predetermined length. Located at the transition between the inlet and outlet portions is means defining a cylindrical constriction, said constriction having a third diameter less than the second diameter, and the inlet portion, outlet portion and cylindrical constriction having a common axis. Audible sound of about 80 DB is produced by the whistle when a pressure differential in the range of about 0.005 to 0.02 psi exists across the inlet and outlet portions.

A feature of the whistle is the ability to detect and provide audible indication of extremely small pressure differentials that may exist across various boundaries. Examples of such boundaries is that which exists between a furnace heating chamber and heating exhaust ducts. Typically, a dust and soot collecting filter is placed at such a boundary to filter, any particulate matter that may be produced in the heating chamber. The pressure differential across the filter caused by the accumulation of particulate within the filter is detected by the whistle. Indication of such a pressure differential is by means of an audible sound produced by the whistle having a pitch or frequency of about 1000 HZ. Thus, the sound emitted by the whistle in such an application signals the need for timely replacement of the dirty or clogged filter.

A unique feature of the low pressure indicating whistle is the audible nature of the indication rather than visual indicators characterizing other pressure detecting devices.

Another feature of the whistle is that more than one whistle may be used to detect low pressure differentials between a common pressure chamber and other communicating chambers of differing pressure levels. Thus, the whistle may be placed at a boundary where a fan inlets air to a chamber and within a filter that filters exhaust air from the chamber, each of said filters responsive to the pressure differentials across the respective boundaries.

Still another feature of the whistle is the ability to detect pressure gradients in large air flow conduits. Thus, the whistle may be inserted within a monitoring conduit that extends between and is in fluid parallel communication with the main flow for a predetermined length. In such an application, the whistle indicates when the pressure differential or pressure gradient across the predetermined length is within the pressure detection range of the whistle.

The production of audible sound from the whistle relies on modulation effects upon the overall air flow through the whistle. The inlet portion, it is believed, functions primarily as a transmission line tube rather than a chamber resonator so that the length of the tube, rather than its volume, is the factor determining the pitch of frequency of the sound produced. The constriction located between the inlet and outlet portions of the whistle, generates turbulence in the air flow passing therethrough and also in the air region immediately preceding the constriction inlet. It is believed that the constriction is the element that provides the location of an air flow modulation effect upon the air flow through the whistle. Such air flow modulation gives rise to the audible sound at the low threshold pressure differentials existing across the inlet and outlet of the whistle.

The outlet portion is essential to the operation of the whistle in the low threshold pressure differential region. It is believed that the outlet portion serves as impedance matching for the transmission of wave energy from the constriction to the outer environment surrounding the whistle. It is believed that the output portion additionally serves as a loading chamber affecting the air flow modulation at the constriction.

It is believed that the whistle is not an acoustic resonator which characterizes conventional whistles, but a vortex propagation wave resonator where the propagation velocity of vortex waves is a small fraction of the speed of sound. The vortex wave velocity accounts for the low frequency audible sound produced by the whistle, for the short lengths of its inlet portion. The inlet portion can be viewed as functioning as a transmission line resonating at odd multiples of a half wave length of the fundamental sound produced.

With conventional high-pressure whistles, turbulence generated by a constriction located within the whistle creates air masses vibrating at a plurality of frequencies. Several of the air masses are acoustically loaded by an acoustic resonating chamber or tube, thereby absorbing energy from the turbulence at discrete frequencies in order to generate acoustic pressure waves with the same frequencies.

Unlike conventional high pressure whistles described, it is believed that a vibrating air mass, resulting from turbulence generated by the constriction consists of vibrating stable vortices. The vortices act as independent mass units creating pressure waves propagating from vortex to vortex that originate at the constriction and travel to the open ends of the whistle. The open ends, in turn, reflect the waves in a manner analogous to an acoustic pressure wave reflection because of the impedance discontinuity at the open ends of the whistle.

It is believed that a dominant resonance in the whistle consists of eigenvalues of the vortex waves and that this resonance is an intermediate absorber of energy from the initial turbulence which determines the frequencies at which energy absorbtion occurs. It is also believed that the motion of the vortices at both ends of the whistle generates the acoustic pressure waves which are audible and which have wave lengths much longer than would be compatible with the whistle length of an acoustic resonator.

The ease of air passage through the whistle is believed to be due to a non-laminar transport of air masses (vortices) through the constriction. The transport of the vortices is dependent upon the diameter and length of the constriction and is facilitated by a compression expansion mode of the vortices interacting with the constriction. Such interaction causes less frictional heating and viscous losses that would be experienced in laminar flow.

DETAILED DESCRIPTION

Figure 1:
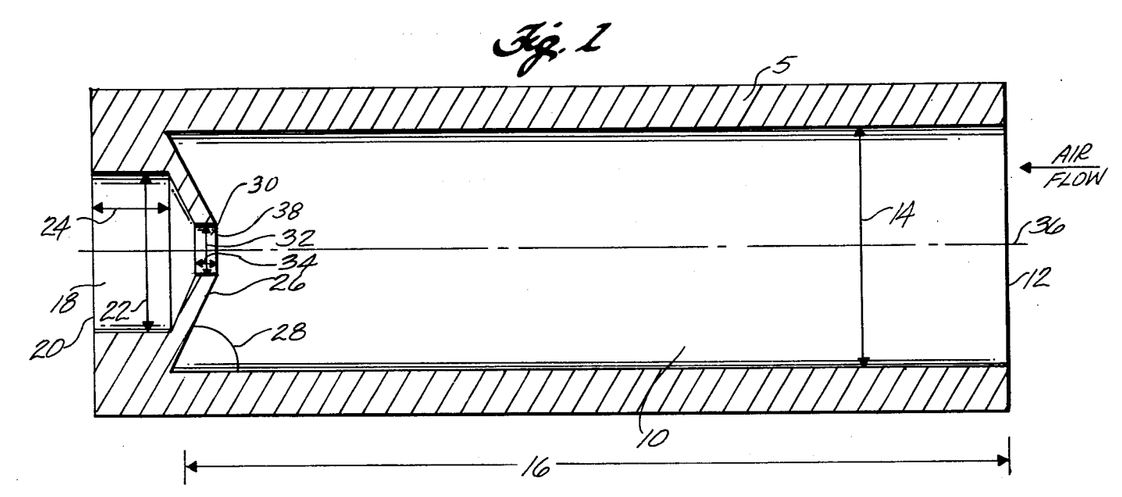
FIG. 1 is a cross-section view of a whistle constructed in accordance with the present invention.

FIG. 1 shows in detail a cross-sectional view of the herein described invention. The whistle 5 has an inlet portion 10 that defines a cylindrical bore having an inlet 12, a bore diameter 14 and a bore length 16. The outlet portion 18 is a cylindrical bore having an outlet 20, a bore diameter 22 and a bore depth 24. Between the inlet portion 10 and the outlet portion 18 is annular extension portion 26. Extension portion 26 extends into the inlet portion 10 from a surface (not shown) that defines the transition between the inlet portion 10 and the outlet portion 18. The intersection between the extension portion 26 and the interior surface of the inlet portion 10 defines an intersection angle 28. The annular extension portion 26 also defines a cylindrical constriction 30 that forms a passageway between inlet portion 10 and outlet portion 18. Cylindrical constriction 30 is in the shape of a bore having a bore diameter 32 and a bore length 34. The inlet portion 10, the outlet portion 18 and constriction 30 being coaxial having a common axis 36.

A low threshold pressure differential in the range of 0.005 to 0.02 psi appearing across the inlet 12 and output 20 causes air to flow through the whistle such that an audible sound having an intensity of about 80 DB is emitted. For the preferred embodiment, the frequency of the audible sound produced is about 1000 HZ. Beyond the 0.02 psi pressure differential, the sound is essentially inaudible until a high threshold pressure differential of about 0.2 psi exists across the whistle. At pressure differentials between 0.2 psi and 100 psi, the whistle produces audible sound having an intensity from 70 to 100 DB, respectively. The frequency of the sound produced is about 3000 HZ, and higher harmonics thereof.

Inlet portion 10 serves as a chamber or tube determining the frequency of the sound produced by the whistle. It is believed that this portion functions primarily as a transmission line tube so that the length of the tube, rather that its volume, is a factor affecting the frequency of the sound. It is further believed that the inlet portion 10 is a transmission line representing resonances of odd multiples of a half wave length of longitudinal waves of either acoustic pressure waves or of colliding vortex pressure waves depending upon the pressure differentials across the whistle.

Constriction 30 forms a constriction for the passage of air between the inlet portion 10 and the outlet portion 18. Constriction 30 generates turbulence in the air flow passing therethrough and also in the region immediately preceding the inlet 38 of the constriction 30. It is believed that the constriction 30 is critical in providing the location of an air flow modulator to create an air flow modulation effect upon the overall air flow through the whistle. Additionally, it is believed that the constriction 30 provides a region of a barrier penetration-type of resonance of the air passing therethrough, thereby facilitating the passage of vortices through the constriction 30.

The outlet portion 18 gives rise to the operation of the whistle in the low threshold pressure differential region. It is believed that this portion is an impedance matching chamber for the transmission of air wave energy from the constriction 30 to the environment beyond output 20. It is also believed that the output portion 18 serves as a loading chamber affecting the air flow modulation at the constriction 30 and possibly affecting the barrier penetration action of the constriction 30.

Figure 2:
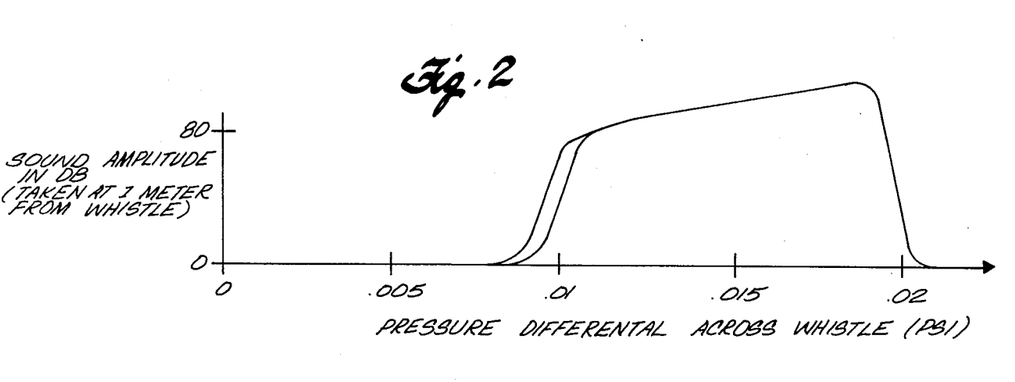
FIG. 2 is a graph of audible sound amplitude versus pressure differential across the whistle described in FIG. 1.

The function of the inlet portion 10, outlet portion 18 and constriction portion 30 as herein described rely on the physical dimensions defining the respective portions. The bore length 16 of the inlet portion 10 affects the frequency of the audible sound produced, as well as the region of pressure differentials in which the low threshold pressure differential causes audible sound. In the preferred embodiment, the bore length 16 is about 2.5 inches. The diameter 14 of the inlet portion 10 controls the amplitude of the audible sound in the low threshold pressure differential region. In the preferred embodiment, the diameter 14 is in the range of about 0.3 to 0.4 inch. The output portion diameter 22 affects the amplitude of the audible sound, and in the preferred embodiment, is about 0.23 inch. The outlet portion bore 24 affects the amplitude of the audible sound, in the preferred embodiment, is about 0.15 inch. The bore diameter 32 affects the amplitude of the audible sound produced, and in the preferred embodiment, is about 0.105 inch. The bore depth 34 of constriction 30 affects the amplitude of the audible sound, and the low threshold pressure differential at which the audible sound commences. In the preferred embodiment, the bore depth 34 is about 0.060 inch. The angle 28 affects the amplitude of the audible sound, and the low threshold pressure differential at which the audible sound commences, said angle ranging from 45° to 90°. In the preferred embodiment, the angle 28 is about 70°. Referring to FIG. 2, there is shown a graph of the amplitude of the audible sound generated by the whistle versus pressure differential across the whistle. The graph presented was generated by a whistle having the dimensions previously described. The low threshold pressure differential at which audible sound commences, is in the range of about 0.005 to 0.01 psi. Above 0.01 psi and below 0.02 psi, the audible sound remains somewhat constant at a level of about 80 DB. The frequency of the sound produced by the whistle is approximately 1000 HZ and is somewhat independent of the pressure differential across the whistle. Above a pressure differential of 0.02 psi across the whistle, the amplitude of the audible sound emanating from the whistle drops rapidly and becomes inaudible above 0.02 psi.

The hysteresis effect illustrated in FIG. 2 is believed to be caused by the higher pressure differential required to initiate sound emission from the whistle as compared to the pressure differential required to sustain sound emission from the whistle.

Prior to the onset of sound emission, the proportion of vortices having the proper energy characteristics for supporting sound emission is extremely small. Therefore, a certain threshold pressure differential is required to initiate sound emission.

During sound emission, it is believed that the proportion of vortices having the proper energy characteristics has been regeneratively increased, thereby relaxing the pressure differential requirement for sustaining such sound emission. Thus, sound emission from the whistle may be sustained at pressure differentials lower than that initially required to start the sound emission process.

Figure 3:
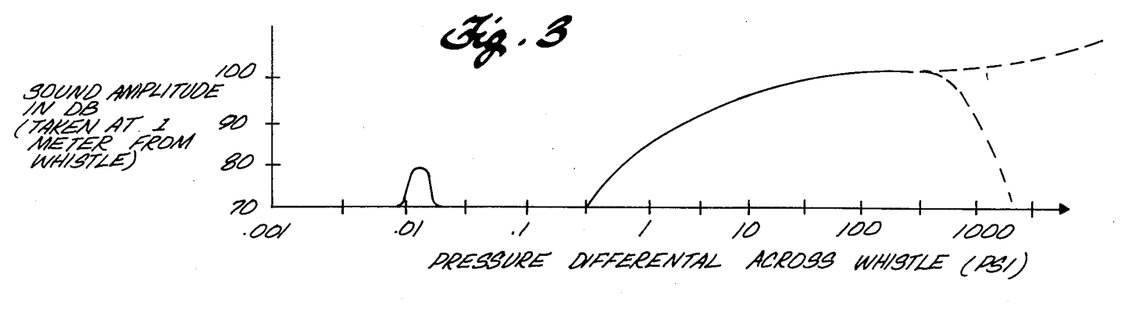
FIG. 3 is a graph of audible sound amplitude versus an expanded pressure differential range across the whistle described in FIG. 1.

Referring to FIG. 3, there is shown a graph of the amplitude of the audible sound produced by the whistle versus the pressure differential across the whistle for pressure differentials in the range of 0.001 to 100 psi. As illustrated by FIG. 3, the whistle constructed with the dimensions herein described, has at least two modes of operation. The low threshold pressure differential mode is the relevant mode for the applications intended, whereas the high threshold pressure differential mode illustrates the range of operation of a conventional turbulence generator/resonator type of whistle. The existence of the low threshold pressure differential mode depends critically upon the dimensions herein previously described as discovered by extensive experimentation, whereas the high threshold pressure differential mode in contrast appears to operate without the necessity of such critical dimensioning. The graph illustrating the whistle response in FIG. 3 represents an envelope of the peaks of the response of the whistle at successively higher pressure differentials within the range from 0.1 to 100 psi.

Figure 4:
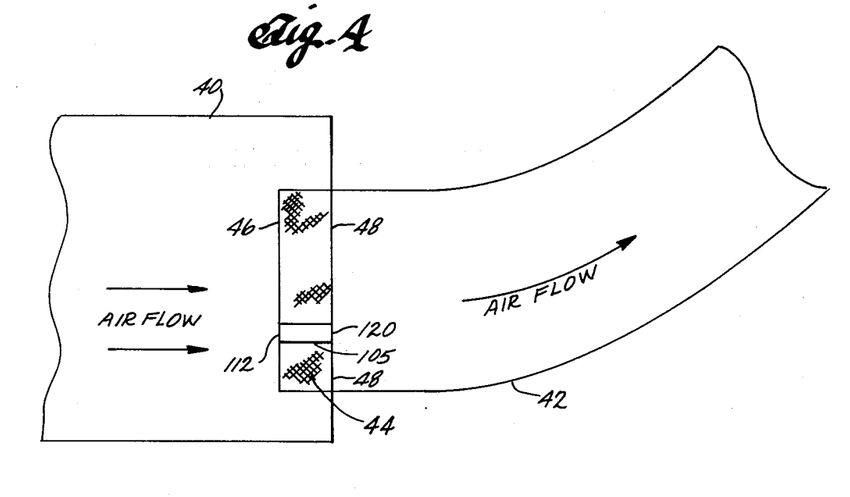
FIG. 4 is an illustration of the whistle in a furnace filter application.

Referring to FIG. 4, there is shown an illustration of an application of the whistle herein described. Furnace 40 is a conventional heater producing heated air for distribution, through ducting 42, to an area to be heated. Between the furnace 40 and ducting 42 is a particulate and soot filter 44. Located within the filter 44 is the whistle 105 having an inlet 112 at the inlet side 46 of filter 44 and an outlet 120 at the outlet side 48 of filter 44. In normal operation, no sound is emitted by the filter as long as the particulate concentration within the filter is insufficient to cause a pressure differential across the filter that is within the operative range of the whistle. At such time that the particulate concentration is sufficient to cause a pressure differential across the filter that is within the operative range of the whistle, audible sound will be emitted thereby signaling the requirement of filter maintenance.

While the basic principle of this invention has been herein illustrated along with one embodiment, it will be appreciated by those skilled in the art that variations in the disclosed arrangement both as to its details and as to the organization of such details may be made without departing from the spirit and scope thereof. For example, the inlet portion, the outlet portion and the constriction of the whistle are not restricted to a cylindrical cross-section but may be of a variety of geometric shapes such as rectangular, oval or polygonal. Accordingly, it is intended that the foregoing disclosure and the showing made in the drawings will be considered only as illustrative of the principles of the invention and not construed in a limiting sense.

What is claimed is:

1. A low pressure differential detecting air flow whistle for producing an audible sound comprising:
   inlet means for receiving air flow and for defining an acoustically resonating transmission line;
   constriction means receiving air flow from the inlet means for modulating the air flow and producing thereby turbulence in the air flow passing through the constriction means; and
   outlet means receiving the air flow from the constriction means for defining a loading chamber for providing impedance matching for the transmission of air wave energy from the constriction means to the environment beyond the outlet means, the modulation by the constriction means of the air flow producing an audible sound when a low pressure differential exists across the inlet and outlet means.

2. The whistle of claim 1 formed of a conduit wherein the inlet means is defined by a cylindrical bore having a first diameter and a first bore length, the outlet means is defined by a cylindrical bore having a second diameter and second bore length, said second diameter less than the first diameter, the transition between the first and second diameters defining an annular transition surface between the inlet means and the outlet means, the constriction means located at the transition surface between the inlet and outlet means, said constriction means defined by a cylindrical bore having a third diameter less than the second diameter.

3. The whistle of claim 2 wherein the inlet means, the outlet means and the constriction means have a common axis.

4. The whistle of claim 3 wherein the constriction means includes:
an annular extension portion that extends into the inlet means from the surface that defines the transition between the inlet and outlet means, the intersection between the annular extension portion and the interior surface of the inlet means defining an intersection angle therebetween.

5. The whistle of claim 4 wherein the cylindrical bore of the constriction means has a third diameter and a third bore length, said third diameter is about 0.105 inch, the third bore length is about 0.045 inch, the intersection angle is about 70°, the first diameter is in the range of about 0.3 to 0.4 inch, the first bore length is about 2.5 inches, the second diameter is about 0.23 inch and the second bore length is about 0.15 inch.

6. The whistle of claim 5 wherein audible sound is produced when the pressure differential is in the range of 0.005 to 0.02 psi.

7. A low pressure differential detecting whistle comprising:
a conduit having an inlet and an outlet, the inlet defined by a cylindrical bore having a first diameter in the range of about 0.3 to 0.4 inch and a first bore length of about 2.5 inches, the outlet defined by a cylindrical bore having a second diameter of about 0.23 inch and a second bore length of about 0.15 inch, the transition between the first and second diameters defining an annular transition surface between the inlet and outlet;
means defining a constriction located at the transition surface between the inlet and outlet, said constriction defined by a cylindrical bore having a third diameter of about 0.105 inch and a bore length of about 0.045 inch, said inlet and outlet and constriction having a common axis, said constriction having an annular extension portion that extends into the inlet from the surface that defines the transition between the inlet and outlet, the intersection between the annular extension portion and the interior surface of the inlet defining an intersection angle therebetween of about 70°.

8. The whistle of claim 7 wherein the low pressure differential is in the range of 0.025 to 0.02 psi.

9. A low pressure differential detecting system for determining a level of particulate matter suspended in a filter comprising in combination:
a filter adapted to trap particulate matter suspended in an air flow, said filter having an air inlet and an air outlet; and
whistle means for detecting low pressure differentials between the air inlet and the air outlet, said whistle means emitting audible indication when said pressure differential that corresponds to a concentration of particulate matter trapped within the filter is at a predetermined level, said whistle means comprising:
inlet means for receiving air flow and for defining an acoustically resonating transmission line;
constriction means receiving air flow from the inlet means for modulating the air flow and producing thereby turbulence in the air flow passing through the constriction means; and
outlet means receiving the air flow from the constriction means for defining a loading chamber for providing impedance matching for the transmission of air wave energy from the constriction means to the environment beyond the outlet means, the modulation by the constriction means of the air flow producing an audible sound when a low pressure differential exists across the inlet and outlet means.

10. A low pressure differential detecting whistle for air flows comprising:
a conduit having an inlet and outlet, the inlet being substantially unrestricted and defined by a cylindrical bore having a first diameter and a first bore length, the outlet defining a loading chamber, said outlet defined by a cylindrical bore having a second diameter and a second bore length, said second diameter less than the first diameter, the transition between the first and second diameters defining an annular transition surface between the inlet and outlet; and
means defining a cylindrical constriction located at the transition surface between the inlet and outlet, said constriction having a third diameter less than the second diameter, the constriction means being in fluid communication with the inlet and the loading chamber, the loading chamber providing impedance matching for transmission of air wave energy from the constriction means to the environment beyond the outlet.

11. The whistle of claim 10 wherein the inlet, the outlet and the cylindrical constriction have a common axis.

12. The whistle of claim 11 wherein the means defining the cylindrical constriction includes:
an annular extension portion that extends into the inlet, from the surface that defines the transition between the inlet and outlet the intersection between the annular extension portion and the interior surface of the inlet defining an intersection angle therebetween.

13. The whistle of claim 12 wherein the cylindrical constriction is defined by a cylindrical bore having a third diameter and a third bore length, said third diameter is about 0.105 inch, the third bore length is about 0.045 inch, the intersection angle is about 70°, the first diameter is in the range of about 0.3 to 0.4 inch, the first bore length is about 2.5 inches, the second diameter is about 0.23 inch, the second bore length is about 0.15 inch and the low pressure differential is in the range of about 0.005 to 0.02 to psi.

14. A low pressure differential detecting system for determining a level of particulate matter suspended in a filter comprising in combination:
a filter adapted to trap particulate matter suspended in an air flow, said filter having an air inlet and an air outlet;
whistle means for detecting low pressure differentials between the air inlet and the air outlet, said whistle means emitting audible indication when said pressure differential that corresponds to a concentration of particulate matter trapped within the filter is at a predetermined level, said whistle means comprising a conduit having an inlet portion and an outlet portion, the inlet portion defined by a cylindrical bore having a first diameter in the range of about 0.3 to 0.4 inch and a first bore length of about 2.5 inches, the outlet portion defined by a cylindrical bore having a second diameter of about 0.23 inch and a second bore length of about 0.15 inch, the transition between the first and second diameters defining an annular transition surface between the inlet and outlet portions; and means defining a constriction located at the transition surface between the inlet and outlet portions, said constriction defined by a cylindrical bore having a third diameter of about 0.105 inch and a bore length of about 0.045 inch, said inlet, outlet and constriction having a common axis, said constriction means having an annular extension portion that extends into the inlet portion from the surface that defines the transition between the inlet and outlet portions, the intersection between the annular extension portion and the interior surface of the inlet portion defining an intersection angle therebetween of about 70°.

15. The system according to claim 14 wherein the audible indication is emitted when the pressure differential is in the range of about 0.005 to 0.02 psi.

16. The system according to claim 15 wherein the whistle means is coupled to the filter in fluid parallel arrangement.

* * * * *

REEXAMINATION CERTIFICATE (3896th)

United States Patent [19]
Williams

[11] B1 4,215,646
[45] Certificate Issued Oct. 12, 1999

[54] LOW PRESSURE DIFFERENTIAL DETECTING WHISTLE

[76] Inventor: Douglas J. Williams, P.O. Box 55083, Valencia, Calif. 91355

Reexamination Requests:
No. 90/004,545, Feb. 10, 1997
No. 90/004,666, Jun. 12, 1997

Reexamination Certificate for:
Patent No.: 4,215,646
Issued: Aug. 5, 1980
Appl. No.: 05/957,444
Filed: Nov. 3, 1978

[51] Int. Cl.$^6$ .............................. B60Q 5/00; G10K 5/00
[52] U.S. Cl. ...................... 116/70; 116/58 R; 116/112; 116/137 R; 116/138; 116/DIG. 19; 116/DIG. 25
[58] Field of Search ................................. 116/70, 67 R, 116/112, 137 A, 137 R, DIG. 25, DIG. 42; 84/330, 334, 335, 383 R, 398; 446/204, 205, 206, 216; 55/DIG. 34; 96/419, 421

[56] References Cited

U.S. PATENT DOCUMENTS

| | | |
|---|---|---|
| Re. 28,268 | 12/1974 | Autrand . |
| 291,548 | 1/1884 | Swan .................................. 446/204 |
| 1,770,094 | 7/1930 | Wickersham . |
| 2,373,129 | 4/1945 | Magnus . |
| 2,376,129 | 5/1945 | Ardenne . |
| 2,496,134 | 1/1950 | Scully . |
| 2,682,250 | 6/1954 | Ulrich . |
| 2,721,533 | 10/1955 | Alderfer . |
| 2,745,307 | 5/1956 | Elsasser . |
| 2,753,831 | 7/1956 | Davies . |
| 2,779,305 | 1/1957 | Dunkelman . |
| 2,782,747 | 2/1957 | Alderfer . |
| 2,804,839 | 9/1957 | Hallinan . |
| 2,820,390 | 1/1958 | Vento . |
| 3,085,349 | 4/1963 | Barbee . |
| 3,452,385 | 7/1969 | Fleck . |
| 3,529,407 | 9/1970 | Nowicki . |
| 3,736,900 | 6/1973 | Nowicki . |
| 3,740,931 | 6/1973 | Nowicki . |
| 3,768,437 | 10/1973 | Bruinsma et al. . |
| 3,924,559 | 12/1975 | Renner, Jr. et al. . |
| 4,034,813 | 7/1977 | Le Day . |
| 4,091,762 | 5/1978 | Ruehl . |
| 4,321,070 | 3/1982 | Bede ......................................... 116/70 |

OTHER PUBLICATIONS

Dependency of the Primary Pfeifenton (pipe tone) Frequency on Pipe Orifice, A.B.C. Anderson, Aug. 1952.
"Some Experiments Concerning the Hole and Ring Tone" R. C. Chanaud and Alan Powell, *The Journal of the Acoustical Society of America*, vol. 37, No. 5 (May 1965) pp. 902–911.

*Primary Examiner*—Andrew Hirshfeld

[57] ABSTRACT

A whistle audibly responsive to extremely small pressure differentials is described. The whistle has a cylindrical inlet portion, a cylindrical outlet portion and a cylindrical constriction that form a passageway between said inlet and outlet portions. The whistle produces audible sound having an intensity of about 80 DB in response to a pressure differential, across the inlet and outlet portions, that is in the range of about 0.005 to 0.02 psi.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 2–8 and 10–16 is confirmed.

Claims 1 and 9 are cancelled.

* * * * *